United States Patent
Yu et al.

(10) Patent No.: US 9,006,379 B2
(45) Date of Patent: Apr. 14, 2015

(54) PROCESS TO PRODUCE POLYCARBAMATE USING A GRADIENT FEED OF UREA

(71) Applicant: Dow Global Technologies LLC, Midland, MI (US)

(72) Inventors: Xinrui Yu, Midland, MI (US); Yiyong He, Midland, MI (US); Ronald B. Leng, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 97 days.

(21) Appl. No.: 13/955,612

(22) Filed: Jul. 31, 2013

(65) Prior Publication Data

US 2015/0038669 A1 Feb. 5, 2015

(51) Int. Cl.
| | |
|---|---|
| *C08G 12/34* | (2006.01) |
| *C08G 63/668* | (2006.01) |
| *C08G 65/333* | (2006.01) |
| *C08G 71/04* | (2006.01) |
| *C08G 63/685* | (2006.01) |

(52) U.S. Cl.
CPC .............. *C08G 71/04* (2013.01); *C08G 63/668* (2013.01); *C08G 63/6852* (2013.01); *C08G 65/33303* (2013.01)

(58) Field of Classification Search
CPC .......................... C08G 18/286; C08G 18/3271
USPC .................................. 528/256, 363, 367, 370
See application file for complete search history.

(56) References Cited

U.S. PATENT DOCUMENTS

2011/0313091 A1* 12/2011 Argyropoulos et al. ...... 524/391

OTHER PUBLICATIONS

Kenneth D.M. Harris, "Fundamental and Applied Aspects of Urea and Thiourea Inclusion Compounds," Supramolecular Chem., Jan.-Mar. 2007, vol. 19 (1-2), pp. 47-53.

* cited by examiner

*Primary Examiner* — Gregory Listvoyb

(57) ABSTRACT

A process to produce polycarbamate comprising providing urea in liquid form; and adding the urea in liquid form to a polyol in a reduced gradient profile to form polycarbamate product is provided. Also provided are: (a) a reaction product of the process and (b) an apparatus for operating the process.

11 Claims, 2 Drawing Sheets

PROCESS TO PRODUCE POLYCARBAMATE USING A GRADIENT FEED OF UREA

FIELD OF INVENTION

The instant invention relates to a process to produce polycarbamate, a reaction product thereof and an apparatus for conducting the process.

BACKGROUND OF THE INVENTION

Polyurethane is a polymer composed of a chain of organic units with carbamate linkages. Polyurethanes may be produced using isocyanate as a starting material. However, trace amounts of residual isocyanates raise health and safety concerns. As an alternative, polyurethanes have been produced using polyols and methyl carbamate as the starting materials. Methyl carbamate, however, also gives rise to health and safety concerns. There remains a need for alternative polyurethane production methods which provide polyurethanes useful in a variety of applications while minimizing health and safety concerns.

SUMMARY OF THE INVENTION

The instant invention is a process to produce polycarbamate, a reaction product thereof and an apparatus for conducting the process.

In one embodiment, the instant invention provides a process to produce polycarbamate comprising: providing urea in liquid form; adding the urea in liquid form to a polyol in a reduced gradient profile to form polycarbamate product.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
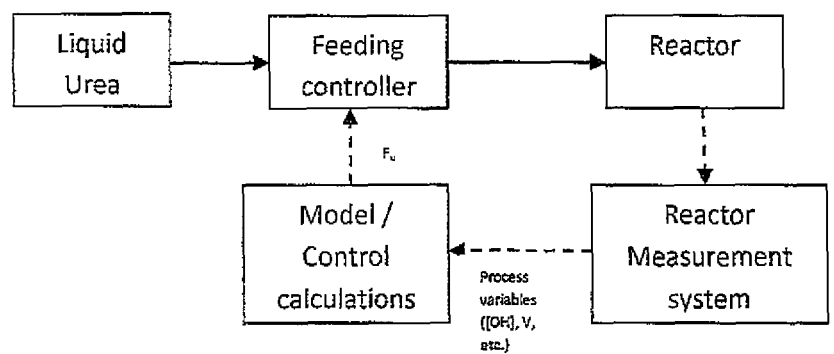
FIG. 1 is a block flow diagram illustrating an embodiment of an apparatus for operating the inventive process.

The instant invention is a process to produce polycarbamate, a reaction product thereof and an apparatus for conducting the process.

The process to produce polycarbamates according to the present invention comprises providing urea in liquid form; and adding the urea in liquid form to a polyol in a reduced gradient profile to form polycarbamate product.

In an alternative embodiment, the instant invention further provides a reaction product produced by any embodiment of the inventive process described herein.

In yet another embodiment, the instant invention provides an apparatus for operating any embodiment of the inventive process described herein.

Urea

The liquid form of the urea (or "liquid urea") may be achieved in any acceptable manner. For example, the urea may be dissolved in a first solvent. Alternatively, the urea may be melted. In yet another alternative, the urea may be suspended in a clathrate. A urea clathrate may also be known as a urea inclusion compound and may have the structure as described in "Supramolecular Chemistry" John Wiley & Sons, Jonathan w. Steed, Jerry L. Atwood, pp. 393-398 and Harris, K. D. M., "Fundamental and Applied Aspects of Urea and Thiourea Inclusion Compounds", Supramol. Chem. 2007, 19, 47-53.

The liquid form of the urea may alternatively be present in a combination of liquid forms. In a particular embodiment, the urea is dissolved in water. In another embodiment, the urea may be dissolved in a mixture of two or more first solvents. Such first solvents include organic solvents. In an alternative embodiment, the urea is dissolved in one or more solvents selected from water and organic alcohols. In one embodiment, urea is partially soluble in the solvent or mixture of solvents. In yet another embodiment, urea is fully soluble in the solvent or mixture of solvents.

Polyol

As used herein, the term "polyol" means an organic molecule having at least 2 —OH functionalities. As used herein, the term "polyester polyol" means a subclass of polyol that is an organic molecule having at least 2 alcohol (—OH) groups and at least one carboxylic ester ($CO_2$—C) functionality. The term "alkyd" means a subclass of polyester polyol that is a fatty acid-modified polyester polyol wherein at least one carboxylic ester functionality is preferably derived from an esterification reaction between an alcoholic —OH of the polyol and a carboxyl of a ($C_8$-$C_{60}$) fatty acid. The polyol may be any polyol; for example, the polyol may be selected from the group consisting of acrylic, styrene-acrylic, styrene-butadiene, saturated polyester, polyalkylene polyols, urethane, alkyd, polyether or polycarbonate. In one exemplary embodiment, the polyol component comprises hydroxyethyl acrylate. In another exemplary embodiment, the polyol component comprises hydroxyethyl methacrylate.

The reaction mixture may comprise from 10 to 100 percent by weight of polyol; for example, from 30 to 70 percent by weight of polyol. In one embodiment, the polyol has a functional structure of a 1,2-diol, 1,3-diol, or combinations thereof.

The polyol can be non-cyclic, straight or branched; cyclic and nonaromatic; cyclic and aromatic, or a combination thereof. In some embodiments the polyol comprises one or more non-cyclic, straight or branched polyols. For example, the polyol may consist essentially of one or more non-cyclic, straight or branched polyols.

In one embodiment, the polyol consists essentially of carbon, hydrogen, and oxygen atoms. In another embodiment, the polyol consists of primary hydroxyl groups. In yet another embodiment, the hydroxyl groups are in the 1,2 and/or 1,3 configuration. Exemplary polyol structures are shown below for illustrative purposes.

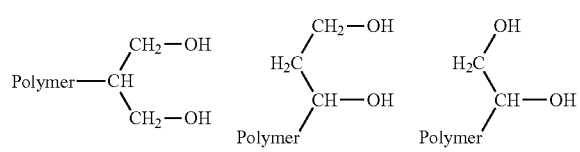

Polyol useful in embodiments of the inventive process include oligomers or polymers derived from hydroxy-containing acrylic monomeric units. Suitable monomers may be, but are not limited to, hydroxyethyl acrylate, hydroxypropyl acrylate, hydroxybutyl acrylate, hydroxydodecyl acrylate, hydroxyethyl methacrylate, hydroxypropyl methacrylate, hydroxybutyl methacrylate, hydroxydodecyl methacrylate, hydroxybutyl vinyl ether, diethylene glycol vinyl ether and a combinations thereof. The polyol useful in embodiments may be prepared by reacting at least one hydroxyl-containing monomer with one or more monomers. Suitable monomers may be, but are not limited to, vinyl monomers such as styrene, vinyl ether, such as ethyl vinyl ether, butyl vinyl ether, cyclohexyl vinyl ether, ester of unsaturated carbonic acid and dicarbonic acid, such as methyl acrylate, methyl methacrylate, ethyl acrylate, ethyl methacrylate, 2-ethylhexyl acrylate, 2-ethylhexyl methacrylate, dodecyl acrylate, dodecyl methacrylate, dimethyl maleate and a mixture thereof.

Polyols useful in certain embodiments of the inventive process include polyether polyols and polyester polyols. Suitable polyols include, for example, ethylene glycol, diethylene glycol, neopentyl glycol, 1,4-butanediol, 1,6-hexanediol, glycerol, pentaerythritol, sorbitol and mannitol. Suitable glycols thus include ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, dimethylolpropionic acid, and the like.

Polycarboxylic acids useful in the invention may include, but are not limited to, phthalic anhydride or acid, maleic anhydride or acid, fumaric acid, isophthalic acid, succinic anhydride or acid, adipic acid, azeleic acid, and sebacic acid, terephthalic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, 2,6-naphthalenedicarboxylic acid, glutaric acid, trimellitic anhydride or acid, citric acid, pyromellitic dianhydride or acid, trimesic acid, sodium sulfoisophthalic acid, as well as from anhydrides of such acids, and esters thereof, where they exist. Optionally monocarboxylic acids may be employed including, but not limited to, benzoic acid. The reaction mixture for producing alkyds includes one or more aliphatic or aromatic polycarboxylic acids, esterified polymerization products thereof, and combinations thereof. As used herein, the term "polycarboxylic acid" includes both polycarboxylic acids and anhydrides thereof. Examples of suitable polycarboxylic acids for use in the present invention include phthalic acid, isophthalic acid, terephthalic acid, tetrahydrophthalic acid, naphthalene dicarboxylic acid, and anhydrides and combinations thereof.

Addition Step

In a certain embodiment of the process, the addition of the urea in liquid form to the polyol is conducted in the presence of a catalyst. Suitable catalysts for use in this process include, but are not limited to, organo-tin compounds. The use of this type of catalyst is well known in the art. Examples of catalysts useful in the present invention include, but are not limited to, dibutyltin diacetate, and dibutyltin oxide. In a particular embodiment, the catalyst is used in an amount from 0.1% to 1.0 wt % based on polyol weight. All individual values and subranges from 0.1 to 1.0 wt % are included herein and disclosed herein; for example, the catalyst amount may range from a lower limit of 0.1, 0.2, 0.4, 0.6 or 0.8 wt % based on polyol weight to an upper limit of 0.15, 0.3, 0.5, 0.7, 0.9 or 1.0 wt % based on polyol weight. For example, the catalyst amount, in certain embodiments, may be from 0.1 to 1.0 wt % based on polyol weight, or in the alternative, from 0.5 to 1.0 wt % based on polyol weight, or in the alternative, from 0.1 to 0.6 wt % based on polyol weight.

In one embodiment of the first process, the polyol is complete polyol in the absence of any solvent. In an alternative embodiment of the first process, the polyol is dissolved in a second solvent prior to the adding the liquid urea to the dissolved polyol. The second solvent may be any solvent or mixture of solvents in which the polyol is soluble or partially soluble. In certain embodiments, the first and second solvents form a heterogeneous azeotrope allowing removal of the first solvent by decantation or other means. In certain embodiments, removal of the first solvent from a heterogeneous azeotrope permits concurrent removal of certain by-products, such as ammonia, which are soluble in the first solvent. In yet an alternative embodiment, the first and second solvents form a heterogeneous azeotrope allowing removal of the first solvent and further wherein the second solvent is returned to the reactor.

In certain embodiments, the process achieves at least a 50% conversion of hydroxyl groups of the polyol. All individual values and subranges from at least 50% conversion are included herein and disclosed herein; for example, the hydroxyl conversion may range from a lower limit of 50%, or in the alternative, the hydroxyl conversion may range from a lower limit of 55%, or in the alternative, the hydroxyl conversion may range from a lower limit of 60%, or in the alternative, the hydroxyl conversion may range from a lower limit of 65%, or in the alternative, the hydroxyl conversion may range from a lower limit of 70%, or in the alternative, the hydroxyl conversion may range from a lower limit of 75% or in the alternative, the hydroxyl conversion may range from a lower limit of 80%, or in the alternative, the hydroxyl conversion may range from a lower limit of 85%.

Gradient Profile of Urea Addition

In embodiments of the inventive process, the liquid urea is added to the polyol with a gradient feed rate. As used herein, gradient feed rate means that the feed rate of the urea changes in a nonlinear manner as a function of time. The consumption of the hydroxyl groups of the polyol in the reaction with urea is a second order reaction and the hydroxyl concentration decreases exponentially with reaction time. The gradient profile adjusts the liquid urea feeding rate according to the consumption of hydroxyl functionality in a manner to avoid or minimize the accumulation of unreacted urea in the reaction system. In yet another embodiment, the gradient profile results in reducing the formation of impurities, and particularly impurities arising from the following reactions:

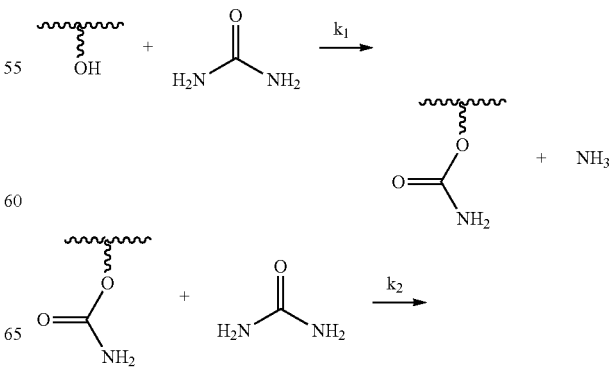

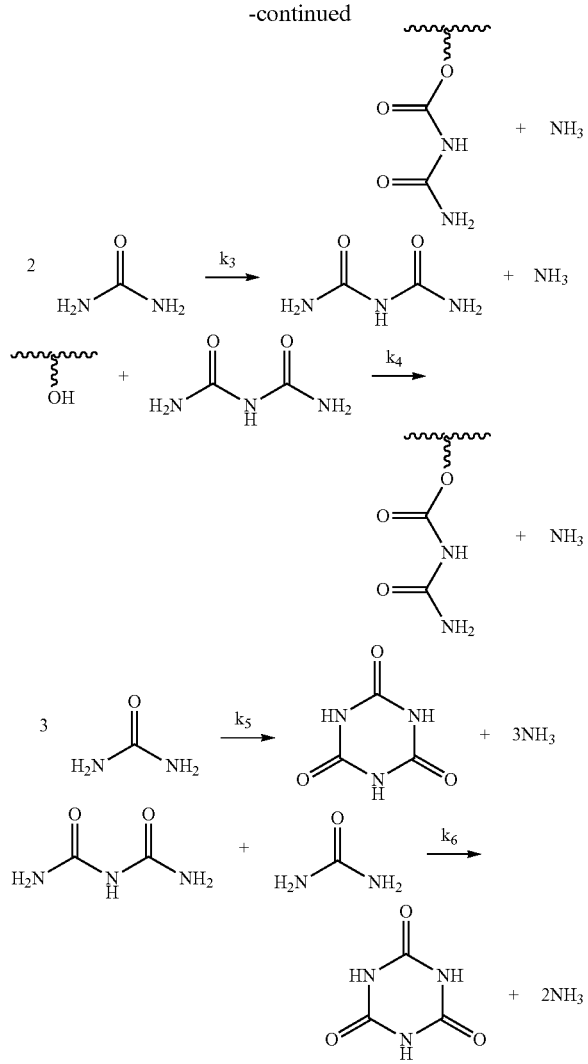

In an alternative embodiment, the instant invention provides a process, reaction product thereof and an apparatus for conducting the process in which urea in liquid form is used, in accordance with any of the preceding embodiments, except that the urea feeding rate is dynamically updated according to the following: $C_u \approx$ constant during feeding time;

$$\frac{F_u(t) \cdot \rho_{soln} \cdot Conc(\text{urea})/M_{urea}}{V_r} =$$

$$\alpha \cdot C_{OH} = \alpha \cdot C_{OH}^0 e^{-kC_u t} \text{ and } \int_0^{t_f} F_u(t)\,dt = V_u,$$

wherein $t_f$=urea solution feeding time; $C_u$=pseudo-steady state concentration of urea in reactor during feeding, $C_u \le$ solubility of urea in the reaction system; $F_u(t)$=urea solution feeding rate; $\rho_{soln}$=urea solution density; $M_{urea}$=urea molecular weight; Conc(urea)=concentration of urea in the feeding stream; $C_{OH}$=hydroxyl molar concentration; $C_{OH}^0$=initial hydroxyl molar concentration; k=reaction rate coefficient of the desired reaction; $\alpha$=proportional coefficient of OH concentration and feeding rate; $V_r$=total reactant mixture volume in reactor and $V_u$=total urea solution volume.

In an alternative embodiment, the instant invention provides a process, reaction product thereof and an apparatus for conducting the process, in accordance with any of the preceding embodiments, except that the gradient feeding rate of the urea is calculated based on two conditions: (1) the urea concentration is assumed to be at pseudo-steady state, i.e., the difference of urea concentration change caused by the feeding and the consumption by reaction is a constant; and (2) the integral of the urea feeding rate over a specified feeding time equals to the total volume of urea added to the reactor. The first condition may be expressed by the following equation: $C_u \approx$ constant during feeding time; and the second condition may be expressed as follows:

$$\int_0^{t_f} F_u(t)\,dt = V_u$$

In an alternative embodiment, the instant invention provides a process, reaction product thereof and an apparatus for conducting the process, in accordance with any of the preceding embodiments, except that the determination of the optimal urea feeding rate is based on a kinetic model calculation of OH concentration.

In an alternative embodiment, the instant invention provides a process, reaction product thereof and an apparatus for conducting the process, in accordance with any of the preceding embodiments, except that the kinetic modeling is based upon $$F_u(t) = \frac{\alpha \cdot C_{OH}^0 e^{-kC_u t} \cdot V_r \cdot M_{urea}}{\rho_{soln} \cdot conc(\text{urea})}.$$

As used in the foregoing equations: $t_f$=urea solution feeding time; $C_u$=concentration of urea in reactor during feeding, $C_u \le$ solubility of urea in the reaction system; $F_u(t)$=urea solution feeding rate; $\rho_{soln}$=urea solution density; $M_{urea}$=urea molecular weight; Conc(urea)=concentration of urea in the feeding stream; $C_{OH}$=hydroxyl molar concentration; $C_{OH}^0$=initial hydroxyl molar concentration;; k=reaction rate coefficient of the desired reaction; $\alpha$=proportional coefficient of OH concentration and feeding rate; $V_r$=total reactant mixture volume in reactor and $V_u$=total urea solution volume.

In an alternative embodiment, the instant invention provides a process, reaction product thereof and an apparatus for conducting the process, in accordance with any of the preceding embodiments, except that the determination of the optimal urea feeding rate is based on measurement of OH concentration in the reactor. The OH concentration measurement may be accomplished by in situ reactor measurement or ex situ analysis of a sample removed from the reactor. OH concentration may be determined using any appropriate analytical technique, including for example, OH number titration, nuclear magnetic resonance (NMR), infrared spectroscopy (IR), near infrared spectroscopy (NIR) or Raman spectroscopy.

The urea gradient feeding process can be carried out in either a continuous or a discontinuous feeding approach.

An exemplary apparatus useful in embodiments of the present invention is shown in FIG. 1. Liquid urea feed into the reactor is controlled by a Feeding Controller. A Reactor Measurement System may be configured in any manner so as to obtain information (for example, the level of —OH, reactant mixture volume, etc. . . . ) in the reactor. For example, the Reactor Measurement System may include probes for measuring —OH in the reactor. Alternatively, the Reactor Measurement System may involve the removal of samples from the reactor for —OH concentration measurement external to the reactor. The level of —OH determined by the Reactor Measurement System is used in the equations described herein to calculate the rate of urea to be fed into the reactor. The feeding rate of urea can also be influenced by other process parameters, for example, the impurities levels in reactor. Such calculations may occur internally or externally of the Feeding Controller. If the calculations are conducted externally to the Feeding Controller, the amount of urea to be fed into the reactor is supplied to the Feeding Controller.

In an alternative embodiment, the instant invention provides a process, reaction product thereof and an apparatus for conducting the process, in accordance with any of the preceding embodiments, except that the 100% solids polycarbamate product comprises less than or equal to 0.1 wt % cyanuric acid. All individual values and subranges less than or equal to 0.1 wt % is included herein and disclosed herein; for example, the level of cyanuric acid may be from an upper limit of 0.1 wt %, or in the alternative, the level of cyanuric acid may be from an upper limit of 0.08 wt %, or in the alternative, the level of cyanuric acid may be from an upper limit of 0.07 wt %, or in the alternative, the level of cyanuric acid may be from an upper limit of 0.06 wt %.

In an alternative embodiment, the instant invention provides a process, reaction product thereof and an apparatus for conducting the process, in accordance with any of the preceding embodiments, except that the 100% solids polycarbamate product comprises less than or equal to 0.4 wt % biuret. All individual values and subranges less than or equal to 0.4 wt % is included herein and disclosed herein; for example, the level of biuret may be from an upper limit of 0.4 wt %, or in the alternative, the level of biuret may be from an upper limit of 0.35 wt %, or in the alternative, the level of biuret may be from an upper limit of 0.3 wt %, or in the alternative, the level of biuret may be from an upper limit of 0.25 wt %, or in the alternative, the level of biuret may be from an upper limit of 0.2 wt %.

In an alternative embodiment, the instant invention provides a process, reaction product thereof and an apparatus for conducting the process, in accordance with any of the preceding embodiments, except that the 100% solids polycarbamate product comprises less than or equal to 1.5 wt % polyallophanate. All individual values and subranges less than or equal to 1.5 wt % is included herein and disclosed herein; for example, the level of polyallophanate may be from an upper limit of 1.4 wt %, or in the alternative, the level of polyallophanate may be from an upper limit of 1.3 wt %, or in the alternative, the level of polyallophanate may be from an upper limit of 1.2 wt %, or in the alternative, the level of polyallophanate may be from an upper limit of 1.15 wt %.

In an alternative embodiment, the instant invention provides a process, reaction product thereof and an apparatus for conducting the process, in accordance with any of the preceding embodiments, except that the 100% solids polycarbamate product comprises less than or equal to 0.5 wt % unreacted urea. All individual values and subranges less than or equal to 0.5 wt % is included herein and disclosed herein; for example, the level of unreacted urea may be from an upper limit of 0.5 wt %, or in the alternative, the level of unreacted urea may be from an upper limit of 0.36 wt %, or in the alternative, the level of unreacted urea may be from an upper limit of 0.2 wt %, or in the alternative, the level of unreacted urea may be from an upper limit of 0.15 wt %.

EXAMPLES

The following examples illustrate the present invention but are not intended to limit the scope of the invention.

Comparative Example-1

A 50-L jacketed reactor was used for this reaction. The jacket fluid was heated by a heater equipped with a circulation pump. A thermocouple was used to monitor the reactor inner temperature. A nitrogen sparging tube was fed through the reactor top adaptors. The reactor was agitated using two Teflon agitators driven by a motor through the center adaptor on the reactor cover. A water-cooled overhead condenser with a 1-L receiver was installed to collect overhead liquid. The non-condensable gas went through a bubbler filled with mineral oil and then entered a 4-L scrubber filled with water.

18.2 kg PARALOID AU-608X polyol (commercially available from The Dow Chemical Company) was heated to 60° C. and then pumped into the reactor, which consisted of 58 wt % dry polyol and 42 wt % solvent (xylenes). The agitator was started and set at 50 rpm. 3.1 kg xylene solvent was pumped into the reactor to lower the mixture viscosity. 111.2 g (98% pure) dibutyltin oxide was added to the reactor. The jacket fluid heater was set at 158° C. The nitrogen sparging rate was started and the flow rate was set at 0.6 L/min. The stirring rate was increased to 180 rpm.

953.1 g (98% pure) urea was dissolved in 883.3 g deionized water to form aqueous solution. The urea solution was transferred to a 2-L reactor equipped with a pump. The 2-L reactor was agitated at 30 rpm and inerted using nitrogen. When the 50-L reactor temperature reached 140° C., the urea solution pump was started and the flow rate was set at 20 ml/min. The reaction timer was started. The addition of urea solution at 20 ml/min lasted for 31 minutes and the pump rate was adjusted to 2 ml/min to feed the balance of the urea solution. During the urea solution feeding step, the azeotrope of water and xylene was collected in the overhead receiver. Xylene was separated and recycled. After urea solution feeding was complete, the reaction was carried out until the total batch time reached 30 hours. The reactor heater set temperature was set at 70° C. and the stirring rate was set at 50 rpm to cool down the reactor. The reactor was shut down when the reactor temperature was lower than 60° C. The reactor was drained and the resulting product was cloudy with a Gardner level between 2 and 3. 19.8 kg total reaction product was collected. Table 1 below provides OH conversion and by-product and unreacted urea information for Comparative Example 1. Target product selectivity is the percentage of urea reacted to form polycarbamate.

TABLE 1

| | |
|---|---|
| OH conversion | 72.2% |
| Target product selectivity | 79.2% |
| Side products and residues in 100% solids product | |
| Biuret | 0.56 wt% |
| Cyanuric acid | 0.03 wt% |
| Polyallophanate | 0.62 wt% |
| Unreacted urea | 0.44 wt% |
| Side products and residues in final product (including solvent) | |
| Biuret | 0.32 wt% |
| Cyanuric acid | 0.02 wt% |
| Polyallophanate | 0.35 wt% |
| Unreacted urea | 0.25 wt% |

Inventive Example 1

A 50-L jacketed reactor was used for this reaction. The jacket fluid was heated by a heater equipped with a circulation pump. A thermocouple was used to monitor the reactor inner temperature. A nitrogen sparging tube was fed through the reactor top adaptors. The reactor was agitated using two Teflon agitators driven by a motor through the center adaptor on the reactor cover. A water-cooled overhead condenser with a 1-L receiver was installed to collect overhead liquid. The non-condensable gas went through a bubbler filled with mineral oil and then entered a 4-L scrubber filled with water.

18.1 kg PARALOID AU-608X polyol was heated to 60° C. and then pumped into the reactor, which consisted of 58 wt % dry polyol and 42 wt % solvent (xylenes). The agitator was started and set at 50 rpm. 3.3 kg xylene solvent was pumped into the reactor to lower the mixture viscosity. 110.8 g (98% pure) dibutyltin oxide was added to the reactor. The heater was set at 158° C. The nitrogen sparging rate was started and the flow rate was set at 0.6 L/min. The stirring rate was increased to 180 rpm.

935.9 g (98% pure) urea was dissolved in 1143.9 g deionized water to form aqueous solution. The urea solution was transferred to a 2-L reactor equipped with a pump. The 2-L reactor was agitated at 30 rpm and inerted using nitrogen. When the 50-L reactor temperature reached 140° C., the urea solution pump was started and the reaction timer was started. The urea solution was fed into the reactor in a gradient manner over 10 hours. The feeding rates over the course of the reaction were as shown in Table 2.

TABLE 2

| Time (hr) | Urea Solution feeding rate (ml/min) |
|---|---|
| 1 | 4.17 |
| 2 | 3.83 |
| 3 | 3.51 |
| 4 | 3.23 |
| 5 | 2.96 |
| 6 | 2.72 |
| 7 | 2.49 |
| 8 | 2.29 |
| 9 | 2.10 |
| 10 | 1.93 |

During urea solution feeding step, the azeotrope of water and xylene was collected in the overhead receiver. Xylene was separated and recycled. After urea solution feeding was complete, the reaction was carried out until the total batch time reached 30 hours. The reactor heater set temperature was set at 70° C. and the stirring rate was set at 50 rpm to cool down the reactor. The reactor was shut down when the reactor temperature was lower than 60° C. The reactor was drained and the product was clear with a Gardner level of less than or equal to 1. 18.7 kg total reaction product was collected. Table 3 provides the —OH conversion, unreacted OH and by-product levels.

TABLE 3

| OH conversion | 82.4% |
|---|---|
| Target product selectivity | 86.9% |
| Side products and residues in 100% solids product | |
| Biuret | 0.18 wt% |
| Cyanuric acid | 0.05 wt% |
| Polyallophanate | 1.00 wt% |
| Unreacted urea | 0.10 wt% |
| Side products and residues in final product (including solvent) | |
| Biuret | 0.11 wt% |
| Cyanuric acid | 0.03 wt% |
| Polyallophanate | 0.60 wt% |
| Residual urea | 0.06 wt% |

In Comparative Example 1 the urea solution was fed using two rates (20 ml/min and 2 ml/min). In Inventive Example 1 the urea solution was fed using a gradient feeding rate as shown above. Comparative Example 1 exhibited an OH conversion of 72%. The low polycarbamate functionality content in the product provided insufficient crosslinking capability for use in coating applications. The product from Comparative Example 1 also exhibited a heavy color and higher unreacted urea content. Furthermore, due to the higher level of by-product formation, the selectivity of the target reaction (i.e., formation of polycarbamate) was only 79.2%.

Inventive Example 1 exhibited a higher OH conversion, 82.4%. The selectivity for the target reaction was also much higher than that of Comparative Example 1, namely 86.9%. The biuret level and unreacted urea are both substantially lower than achieved by Comparative Example 1.

Exemplary Calculations

1. Pseudo-Steady State Urea Concentration

Figure 2:
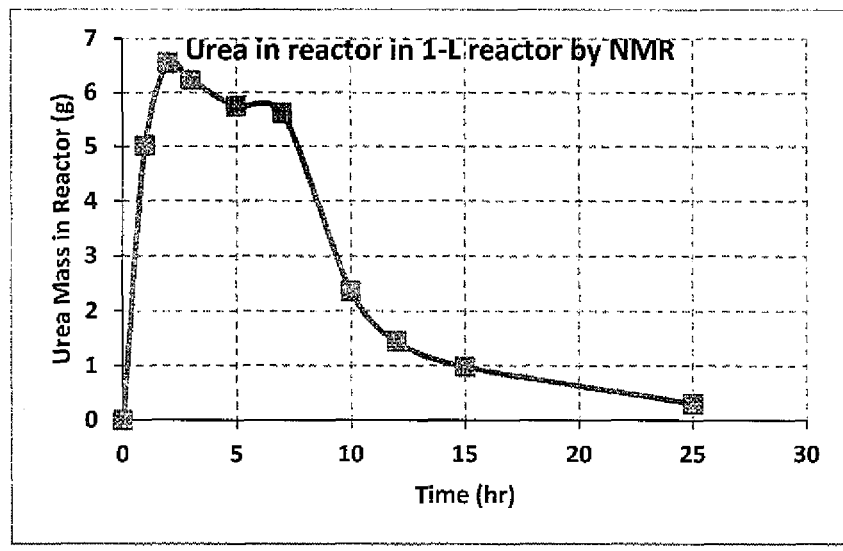
FIG. 2 is a graph illustrating the mass of urea in the reactor as a function of time.

The urea steady state concentration determination is a trial-and-error procedure. A reaction is run with a urea concentration determined either from similar condition batches or from an empirical estimation in the calculation of urea feeding rate. During the reaction, the actual urea concentration were determined and the model corrected for future batch reactions. In the calculation, the first assumption is that the urea concentration ($C_u$) is relatively stable. FIG. 2 shows the actual urea in a 1-L batch reaction of urea and polyol determined using NMR. The urea was fed in a gradient manner over a period of 8 hours. As seen in FIG. 2, the urea content is relatively stable during most of the feeding period, thereby verifying the steady state assumption. The calculated average urea concentration during feeding is 0.143 mol/L, which was used as $C_u$ for the gradient feeding rates calculation. One of ordinary skill in the art would understand that the steady state urea concentration will vary based upon the reactants used and reaction conditions. One of ordinary skill in the art would further understand that the allowed steady state urea concentration will depend on the allowed impurities levels in the final product.

2. Gradient Feeding Calculation

The parameter values in Table 4 were used for the gradient feeding rate in Inventive Example

TABLE 4

| $t_f$ | 10 hr | Total urea feeding time for Inventive Example 1 |
|---|---|---|
| $C_{OH}^0$ | 0.91 mol/L | Initial OH concentration for Inventive Example 1 |
| k | 0.6 L/(mol · hr) | Target reaction kinetic parameter fit from model for PARALOID AU-608X |
| $C_u$ | 0.143 mol/L | Urea concentration (pseudo-steady state) for Inventive Example 1 |
| $V_r$ | 25 L | Reactant volume for Inventive Example 1 |
| $M_{urea}$ | 60.06 g/mol | Urea molecular weight |
| $\rho_{soln}$ | 1.15 g/ml | Urea solution density for Inventive Example 1 |
| Conc(urea) | 45.0% | Urea solution concentration for Inventive Example 1 |

These parameter values were used in $$F_u(t) = \frac{\alpha \cdot C_{OH}^0 e^{-kC_u t} \cdot V_r \cdot M_{urea}}{\rho_{soln} \cdot conc(\text{urea})}$$

and $$\int_0^{t_f} \frac{\alpha \cdot C_{OH}^0 e^{-kC_u t} \cdot V_r \cdot M_{urea}}{\rho_{soln} \cdot conc(\text{urea})} dt = V_u$$

$V_u$ was calculated to be 1754 ml. The coefficient $\alpha$ was determined using:

$$\alpha \cdot \frac{1}{-kC_u} e^{-kC_u t} \Big|_0^{t_f} = \frac{V_u \cdot \rho_{soln} \cdot conc(\text{urea})}{C_{OH}^0 \cdot V_r \cdot M_{urea}}$$

In Inventive Example 1, $\alpha$=0.094769, and the feeding rates in Table 2 were calculated.

Test Methods

Test methods include the following:
OH Number Titration

OH number is the magnitude of the hydroxyl number for a polyol as expressed in terms of milligrams potassium hydroxide per gram of polyol (mg KOH/g polyol). Hydroxyl number (OH #) indicates the concentration of hydroxyl moieties in a composition of polymers, particularly polyols. The hydroxyl number for a sample of polymers is determined by first titrating for the acid groups to obtain an acid number (mg KOH/g polyol) and secondly, acetylation with pyridine and acetic anhydride in which the result is obtained as a difference between two titrations with potassium hydroxide solution, one titration with a blank for reference and one titration with the sample. A hydroxyl number is the weight of potassium hydroxide in milligrams that will neutralize the acetic anhydride capable of combining by acetylation with one gram of a polyol plus the acid number from the acid titration in terms of the weight of potassium hydroxide in milligrams that will neutralize the acid groups in the polyol. A higher hydroxyl number indicates a higher concentration of hydroxyl moieties within a composition. A description of how to determine a hydroxyl number for a composition is well-known in the art, for example in Woods, G., The ICI Polyurethanes Book, $2^{nd}$ ed. (ICI Polyurethanes, Netherlands, 1990).

Gardner color: was measured according to ASTM D1544 "Standard Test Method for Color of Transparent Liquids (Gardner Color Scale)" using a HunterLab colorimeter.

$^{13}$C NMR: All samples were characterized by $^{13}$C NMR in solutions. For a typical sample preparation, 0.6 g dry material was dissolved in 2.5 mL DMSO-$d_6$ solvent at room temperature in a glass vial. The DMSO-$d_6$ solvent contains 0.015 M Cr(acac)$_3$ as a relaxation agent. The solution was then transferred to a 10 mm NMR tube for characterization. Quantitative inverse-gated $^{13}$C NMR experiments were performed on a Bruker Avance 400 MHz ($^1$H frequency) NMR spectrometer equipped with a 10 mm DUAL C/H cryoprobe. All experiments were carried out without sample spinning at 25.0° C. Calibrated 90° pulse was applied in the inverse-gated pulse sequence. The relaxation delay between consecutive data acquisitions is 5*$T_1$, where $T_1$ is the longest spin-lattice relaxation time of all nuclei in the measured system. The $^{13}$C NMR spectra were processed with a line broadening of 1 Hz, and referenced to 39.5 ppm for the DMSO-$d_6$ resonance peak.

Information that can be obtained from $^{13}$C NMR spectra includes the percent of hydroxyl conversion, byproduct levels and solid content of the reaction product. The carbon next to a hydroxyl group has a chemical shift change after the carbamylation reaction. The hydroxyl conversion was calculated from the peak intensity ratio of the carbon after and before a carbamylation reaction. In a quantitative $^{13}$C NMR spectrum, each component of the measured system has a unique resonance peak, and its peak intensity is proportional to the molar concentration of that species. The byproduct levels and solid content were calculated by integrating the desired peaks. The molar concentration can be converted to weight percentage if the molecular weights for all species are known. In calculating the solid content, any components other than known solvents are classified as solid.

The present invention may be embodied in other forms without departing from the spirit and the essential attributes thereof, and, accordingly, reference should be made to the appended claims, rather than to the foregoing specification, as indicating the scope of the invention.

The invention claimed is:
1. A process to produce polycarbamate comprising:
providing urea in liquid form,;
adding the urea in liquid form to a polyol in a reduced gradient profile to form polycarbamate product.
2. The process according to claim 1, wherein the urea in liquid form is urea dissolved in a solvent.
3. The process according to claim 2, wherein the solvent is water.
4. The process according to claim 1, wherein the urea feeding rate is dynamically updated according to the following: $C_u \approx$constant during feeding time;

$$\frac{F_u(t) \cdot \rho_{soln} \cdot \text{Conc}(\text{urea})/M_{urea}}{V_r} = \alpha \cdot C_{OH} = \alpha \cdot C_{OH}^0 e^{-kC_u t} \text{ and}$$

$$\int_0^{t_f} F_u(t) dt = V_u,$$

$C_{OH}^0 e^{-kC_u t}$ and $\int_0^{t_f} F_u(t)dt = V_u,$ wherein $t_f$=urea solution feeding time; $C_u$=concentration of urea in reactor during feeding, $C_u \leq$solubility of urea in the reaction system; $F_u(t)$=urea solution feeding rate; $\rho_{soln}$=urea solution density; $M_{urea}$=urea molecular weight; Conc(urea)= concentration of urea in the feeding stream; $C_{OH}$=hydroxyl molar concentration; $C_{OH}^0$=initial hydroxyl molar concentration; k=reaction rate coefficient of the desired reaction; $\alpha$=proportional coefficient of OH concentration and feeding rate; $V_r$=total reactant mixture volume in reactor and $V_u$=total urea solution volume.

5. The process according to claim 4, wherein hydroxyl molar concentration, $C_{OH}$ is determined by measurement.
6. The process according to claim 5, wherein the adding the urea in liquid form to a polyol occurs in a reactor and measurement is conducted in the reactor or by sampling from the reactor followed by analysis external to the reactor.
7. The process according to claim 4, wherein the reactor volume, Vr, is measured.
8. The process according to claim 4, wherein the hydroxyl molar concentration, $C_{OH}$ is determined by kinetic modeling.
9. The process according to claim 8, wherein the kinetic modeling is based upon $$F_u(t) = \frac{\alpha \cdot C_{OH}^0 e^{-kC_u t} \cdot V_r \cdot M_{urea}}{\rho_{soln} \cdot conc(\text{urea})}.$$

10. An apparatus for operating the process according to claim 1, the apparatus comprising a control system for adjusting a feed rate of urea.

11. A reaction product produced by the process according to claim 1.

* * * * *